(12) United States Patent
Seki et al.

(10) Patent No.: US 11,097,654 B2
(45) Date of Patent: Aug. 24, 2021

(54) DOOR HANDLE

(71) Applicant: Honda Access Corp., Niiza (JP)

(72) Inventors: Kunihiko Seki, Niiza (JP); Kenichi Nara, Niiza (JP)

(73) Assignee: HONDA ACCESS CORP., Niiza (JP)

(\*) Notice: Subject to any disclaimer, the term of this patent is extended or adjusted under 35 U.S.C. 154(b) by 680 days.

(21) Appl. No.: 15/866,757

(22) Filed: Jan. 10, 2018

(65) Prior Publication Data

US 2018/0194273 A1 Jul. 12, 2018

(30) Foreign Application Priority Data

Jan. 11, 2017 (JP) .............................. JP2017-002949

(51) Int. Cl.
| | | |
|---|---|---|
| *B60Q 1/26* | (2006.01) | |
| *E05B 17/10* | (2006.01) | |
| *B60Q 1/38* | (2006.01) | |
| *F21S 43/20* | (2018.01) | |
| *B60J 5/04* | (2006.01) | |
| *B60Q 1/00* | (2006.01) | |
| *E05B 85/10* | (2014.01) | |
| *E05F 11/54* | (2006.01) | |

(52) U.S. Cl.
CPC .......... *B60Q 1/2669* (2013.01); *B60J 5/0434* (2013.01); *B60Q 1/0017* (2013.01); *B60Q 1/38* (2013.01); *E05B 17/10* (2013.01); *E05B 85/10* (2013.01); *E05F 11/54* (2013.01); *F21S 43/26* (2018.01)

(58) Field of Classification Search
CPC ...... B60Q 1/2669; B60Q 1/38; B60Q 1/0017; E05B 17/10; E05B 85/10; F21S 43/26; E05F 11/54; B60J 5/0434

USPC .. 340/465, 422.5, 426.22, 426.23, 468, 471, 340/472
See application file for complete search history.

(56) References Cited

U.S. PATENT DOCUMENTS 2,308,844 A 1/1943 Wilshusen
5,144,538 A \* 9/1992 Harris .................. B60Q 1/2669
340/479

(Continued)

FOREIGN PATENT DOCUMENTS

CN 2511196 Y 11/2002
DE 20 2008 018 110 U1 10/2011

(Continued)

*Primary Examiner* — Daryl C Pope
(74) *Attorney, Agent, or Firm* — Westerman, Hattori, Daniels & Adrian, LLP

(57) ABSTRACT

A door handle providing a superior visibility from both front and rear directions of a vehicle is provided. The door handle includes: an operating portion that bulges from a door outer surface, defining a space between the door outer surface and the operating portion, allowing a user to insert his or her hand into the space; a fixation portion arranged adjacent to the operating portion, including a lens as a translucent member; an outer surface provided in the lens, the outer surface having such a region that a vehicle rear side of the region is positioned outward as compared to a vehicle front side thereof; and a lighting body serving as a direction indicator allowing a transmissive illumination to be made from the inner surface side of the lens. Thus, the lens can be made visible not only from the vehicular lateral side but from the vehicular front side.

10 Claims, 14 Drawing Sheets

(56) References Cited

U.S. PATENT DOCUMENTS

| | | | | |
|---|---|---|---|---|
| 6,697,042 B1* | 2/2004 | Cohen | ............... | G02B 6/0068 |
| | | | | 345/102 |
| 7,270,452 B2* | 9/2007 | Wang | ............... | B60Q 1/2669 |
| | | | | 362/501 |
| 2003/0031025 A1* | 2/2003 | Huizenga | ............ | B60Q 1/2669 |
| | | | | 362/501 |
| 2010/0020558 A1* | 1/2010 | Goto | .................. | E05B 85/14 |
| | | | | 362/487 |
| 2010/0321946 A1* | 12/2010 | Dingman | ............. | E05B 85/16 |
| | | | | 362/501 |
| 2011/0170305 A1* | 7/2011 | Tanaka | ................ | E05B 17/10 |
| | | | | 362/501 |
| 2012/0081915 A1* | 4/2012 | Foote | ................. | B60Q 1/245 |
| | | | | 362/494 |
| 2012/0127697 A1* | 5/2012 | Kim | .................. | B32B 37/26 |
| | | | | 362/97.2 |
| 2014/0022811 A1* | 1/2014 | Wheeler | ............. | E05B 5/006 |
| | | | | 362/555 |
| 2016/0297340 A1* | 10/2016 | Yang | ................ | B60N 3/026 |
| 2016/0304026 A1* | 10/2016 | Takahashi | ........... | E05B 85/10 |
| 2017/0151903 A1* | 6/2017 | Salter | ............... | B60Q 1/2696 |
| 2019/0093856 A1* | 3/2019 | Mrnustik | ........... | B60Q 1/2669 |

FOREIGN PATENT DOCUMENTS

| | | |
|---|---|---|
| DE | 10 2014 117 909 A1 | 6/2016 |
| JP | 7-9652 U | 2/1995 |
| JP | 2004-243996 A | 9/2004 |
| JP | 2005-1634 A | 1/2005 |
| JP | 2010018046 A | 1/2010 |

* cited by examiner

DOOR HANDLE

TECHNICAL FIELD

The present invention relates to a door handle equipped with a direction indicator.

BACKGROUND ART

A conventional side direction indicator, as illustrated in FIG. 26, has had a required light distribution range 102 of 5 to 60 degrees in a lateral direction, and 15 degrees in a vertical direction, with a vehicle front-rear direction as a reference line 101 of an optical axis. Such lateral direction indicator has often been built in fenders and door mirrors, disclosed in Japanese Utility Model Application Laid-Open No. H7-9652.

On the other hand, if a camera is used instead of a door mirror to obtain a rearward vision with a monitor installed in the car, it becomes necessary to relocate such side direction indicator which is currently built in the door mirror.

In view of the above, there have been proposed a door handle unit provided with a blinker mechanism having a light emitter on a door handle or a door handle base, as disclosed in, for example, Japanese Un-examined Patent Application Publication No. 2005-1634; and a car door blinker provided with a blinker on an outside handle of a car door, as disclosed in, for example, Japanese Un-examined Patent Application Publication No. 2004-243996.

According to the door handle unit of the Japanese Publication No. 2005-1634, since the light emitter is provided on the outer surface of the door handle or the outer surface of the base, and the blinker of the Japanese Publication No. 2004-243996 is provided on the outside handle or on a grip-type handle, there is a problem that securing the rearward light distribution range 102 is difficult and visibility from the front-rear direction of a vehicle is inferior, although visibility from the side direction is excellent.

Also, both of the conventional arts have another problem that since the light emitters (corresponding to a lamp body) are attached to the inner/outer surface of the handle and the outer surface of the base, they tend to be subjected to constraints on installation space and hence the degree of freedom of attachment is low. Particularly, since a blinker (side turn lamp) as a currently legally required component is a part which needs visibility from the rear, it is necessary to distribute the light particularly effectively toward the rear.

SUMMARY OF THE INVENTION

Problems to be Solved by the Invention

In view of the above problems, it is therefore, an object of the present invention to provide a door handle exhibiting an excellent visibility from the front or rear of a vehicle.

Means to Solve the Problems

To achieve the object, there is provided a door handle to be attached to a door of a vehicle according to a first aspect of the invention, comprising:

an operating portion that bulges from a door outer surface, defining a space between the door outer surface and the operating portion, allowing a user to insert his or her hand into the space;

a fixation portion arranged adjacent to the operating portion, including a translucent member;

a slanted portion provided in the translucent member, the slanted portion having such a region that one of a vehicle front side and a vehicle rear side of the region is positioned outward as compared to the other thereof; and a lighting body serving as a direction indicator allowing a transmissive illumination to be made from the inner surface side of the translucent member.

The door handle according to a second aspect of the invention is the one in which the fixation portion is provided in a way such that it joins together a bulging part of the operating portion and the door outer surface of the vehicle, while the lighting body is housed inside the fixation portion.

The door handle according to a third aspect of the invention is the one in which the fixation portion is positioned anterior to the operating portion in the vehicle, while the slanted portion has the vehicular rear side thereof positioned outward as compared to the vehicular front side thereof.

The door handle according to a fourth aspect of the invention is the one in which concavities and convexities are formed on at least one of the inner and outer surfaces of the translucent member.

The door handle according to a fifth aspect of the invention is the one in which a valley portion is formed on the translucent member, and the bottom portion of the valley portion is located beyond the lighting body in the rear direction of the vehicle.

The door handle according to a sixth aspect of the invention is the one in which a mountain portion is formed on the translucent member, and the top portion of the mountain portion is located anterior to the lighting body in the vehicular front-rear direction.

The door handle according to a seventh aspect of the invention is the one in which the lighting body is housed in a door inner space.

According to the first aspect, visibility can be ensured not only from the vehicular lateral side but from the vehicular front or rear side.

According to the second aspect, the slanted portion can be made visible from the vehicular front or rear side.

According to the third aspect, visibility from the front can be particularly enhanced, realizing a compact storage.

According to the fourth aspect, due to the light being diffused, visibility from any directions can be realized.

According to the fifth aspect, visibility from the rear can be achieved.

According to the sixth aspect, visibility from the rear can be achieved.

According to the seventh aspect, degree of freedom at the time of attachment is improved.

MODE FOR CARRYING OUT THE INVENTION

Figure 1:
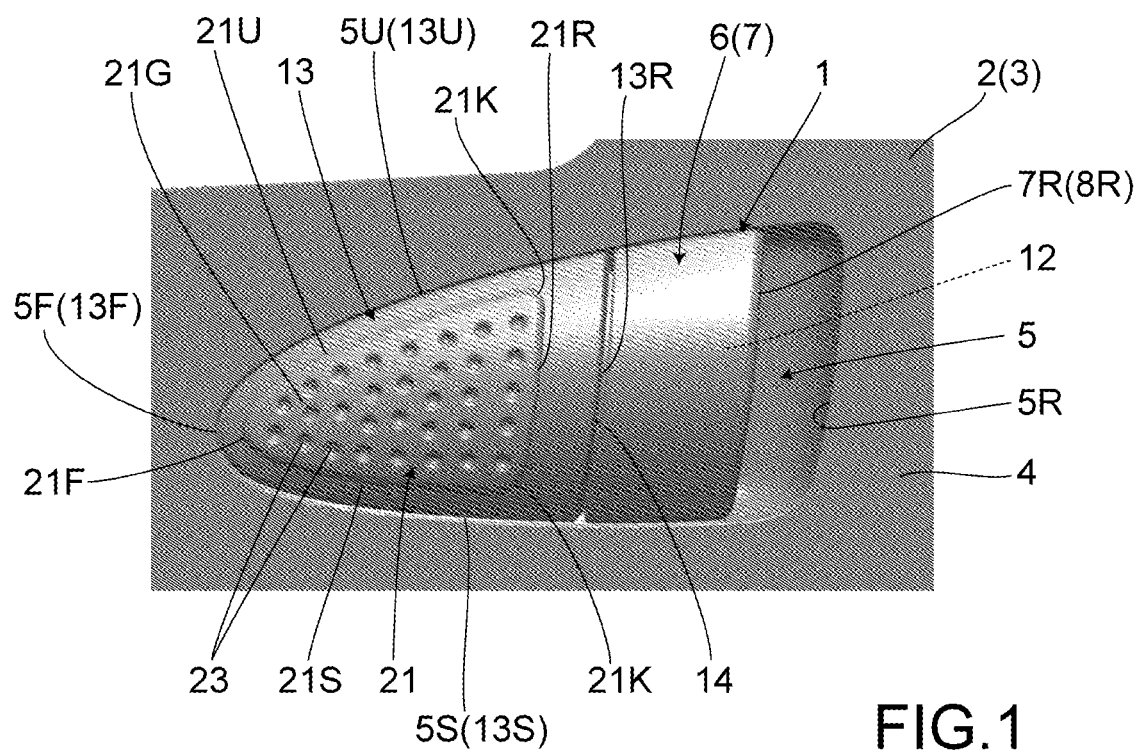
FIG. 1 is a side view showing a door handle of a first embodiment of the invention.
Figure 2:
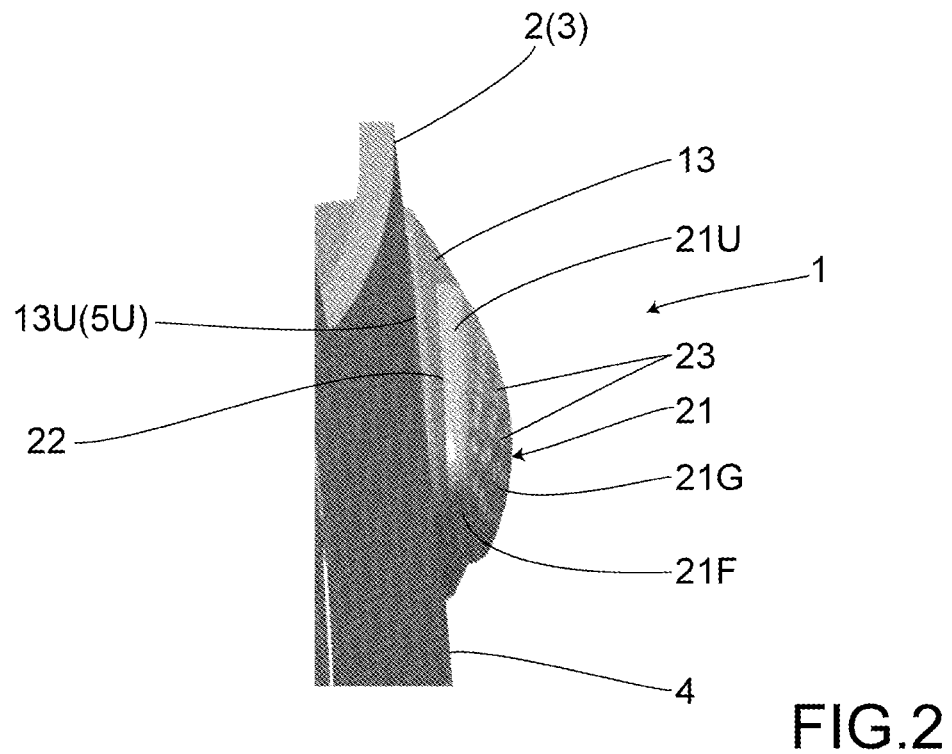
FIG. 2 is a front view of the door handle of the first embodiment.

Embodiments of a door handle of the present invention are described hereunder with reference to the drawings.

First Embodiment

A first embodiment of the invention is shown in FIG. 1 to FIG. 8. As shown in these drawings, a door handle 1 is provided on a door 3 of the driver seat on the right side or a door 3 of the passenger seat on the left side, in a vehicle 2. These drawings show an example where the door handle 1 is provided on a door outer surface 4 of the door 3 on the left side. Here, the door 3 may be any of a front side door and a rear side door.

The door handle 1 has a plate-shaped operating portion 6. This operating portion 6 bulges from the door outer surface 4, is located in a concave portion 5 of the door outer surface 4, thus defining a space allowing a user to insert his or her hand thereinto.

Specifically, the concave portion 5 dented inward is formed on the door outer surface 4 of the door 3, and the operating portion 6 is attached to such concave portion 5. This operating portion 6 includes an operating portion main body 7 made of a plate member convexly curved outward, and the outer surface of the operating portion main body 7 bulges from the door outer surface 4, thus allowing the operating portion main body 7 to serve as a bulging part of the operating portion 6.

Figure 7:
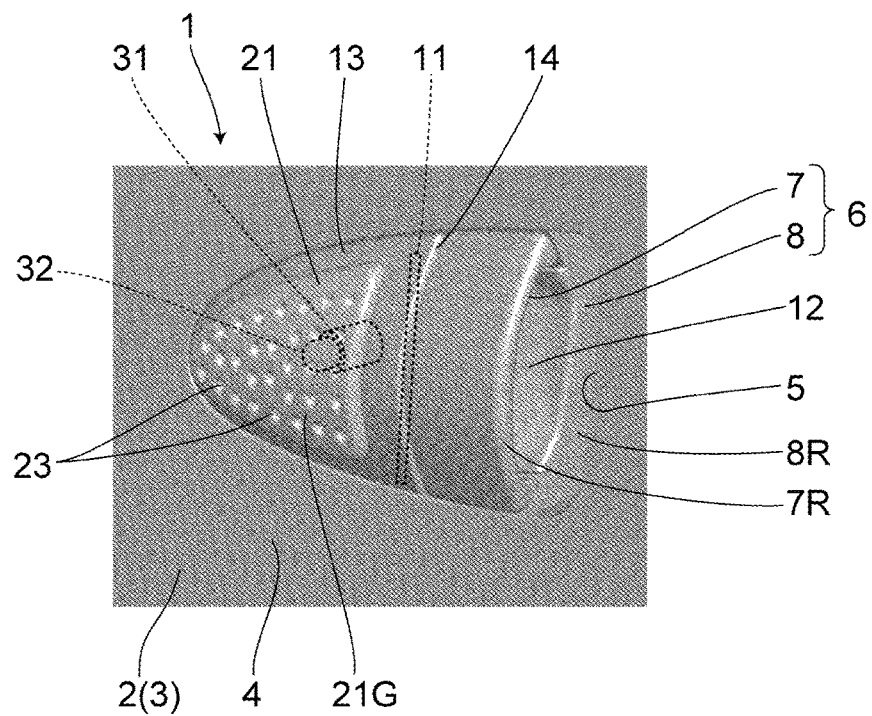
FIG. 7 is a perspective view thereof seen obliquely rearward.

As shown in FIG. 7, for example, the operating portion 6 has a base portion 8. This base portion 8 is attached to the concave portion 5, while a vertical axis portion 11 is provided on the front side of the base portion 8 such that the front side of the operating portion main body 7 is pivotably attached to this axis portion 11. Further, provided between the base portion 8 installed in the concave portion 5 of the door outer surface 4 of the vehicle 2 and the operating portion main body 7 is an operable space 12 allowing the user to insert his or her hand thereinto.

A link piece (not shown) is connected, at the door side, to the operating portion main body 7, and this link piece is then connected to a door lock device (not shown) of the vehicle 2. Here, by putting a hand on the inner surface side of the operating portion main body 7 and then pulling the same toward the user (outward), the operating portion main body 7 will pivot about the axis portion 11, thereby causing the link piece to be pulled outward, thus unlocking the door 3 locked by the door lock device.

A rear wall portion 5R in a front-rear direction is provided on a rear region of the concave portion 5. As shown in FIG. 1, for example, in a side view, the concave portion 5 is configured in a way such that a distance between an upper wall portion 5U and a lower wall portion 5S is getting smaller toward the front side from the rear wall portion 5R, and that a curved front wall portion 5F is formed on the front end of these upper wall portion 5U and lower wall portion 5S.

Further, a rear edge 7R of the operating portion main body 7 and a rear edge 8R of the base portion 8 are apart from the rear wall portion 5R, and provided between the operating portion main body 7 and the rear wall portion 5R is the rear region of the installation concave portion 5 that is communicated with the operable space 12.

The door handle 1 includes a fixation portion 13 provided in a way such that it joins together the front edge of the operating portion main body 7 and the door outer surface 4 surrounding the concave portion 5. The outer surface of this fixation portion 13 bulges from the door outer surface 4 of the vehicle 2. Also, the fixation portion 13 is located on the vehicle front side of the operating portion 6, and is arranged adjacent to such operating portion 6.

Here, provided between the fixation portion 13 and the operating portion main body 7 is a vertical gap 14 enabling the operating portion main body 7 to rotate. Specifically, once the user has released his or her hand from the operating portion main body 7, a restoration unit not shown will serve to restore the operating portion main body 7 to a position where the outer surface of such operating portion main body 7 is continuous with the outer surface of the fixation portion 13.

The fixation portion 13 is formed into a shape corresponding to the concave portion 5. A distance between an upper edge portion 13U and a lower edge portion 13S becomes narrower toward the front side from a rear edge portion 13R of the fixation portion 13. The front ends of these upper and lower edge portions 13U and 13S are joined together by a curved front edge portion 13F.

Figure 3:
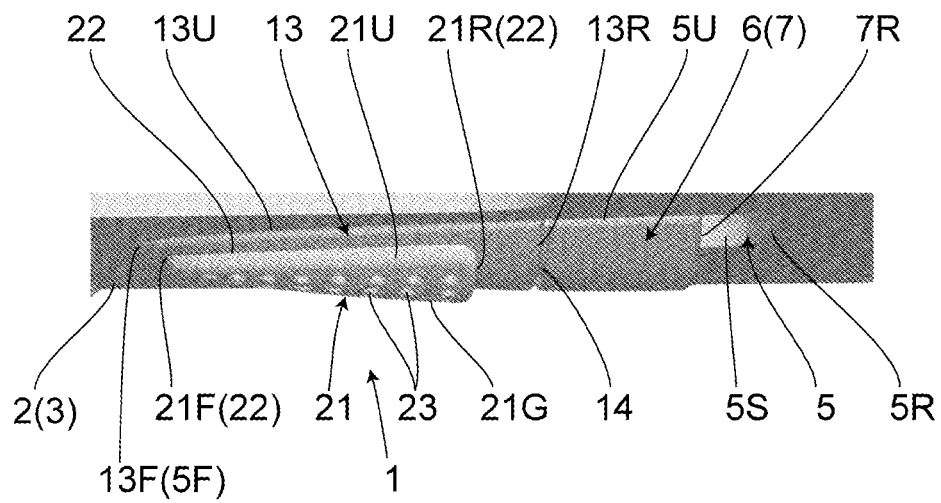
FIG. 3 is a plan view of the door handle of the first embodiment.
Figure 4:
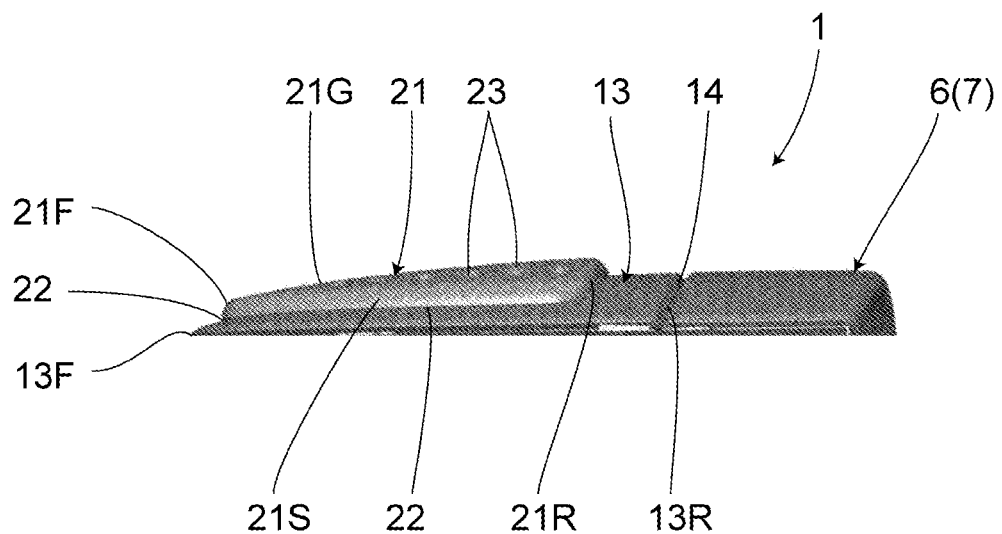
FIG. 4 is a bottom view of the door handle of the first embodiment.

Further, as shown in FIG. 3, for example, the outer surface of the fixation portion 13 is slanted in a manner such that a rear side of such outer surface is positioned outward in a vehicle width direction as compared to a front side thereof. Also, the outer surface of the fixation portion 13 is slightly curved as well. Moreover, the outer surface of the fixation portion 13 is formed into a curved surface with a central region thereof in the vertical direction being positioned outward as compared to the upper and lower edge portions 13U and 13S.

A lens 21 as a translucent member is provided on the outer surface of the fixation portion 13. This lens 21 is formed into a shape that is substantially analogous to that of the fixation portion 13. A distance between an upper edge portion 21U and a lower edge portion 21S is becoming narrower or tapered toward the front side from a rear edge portion 21R of the lens 21. The front ends of these upper and lower edge portions 21U and 21S are joined together by a curved front edge portion 21F. Further, as shown in FIG. 1, a corner portion 21K between the rear edge portion 21R and the upper edge portion 21U is formed into a curved shape, and a corner portion 21K between the rear edge portion 21R and the lower edge portion 21S is formed into a curved shape as well.

Figure 8:
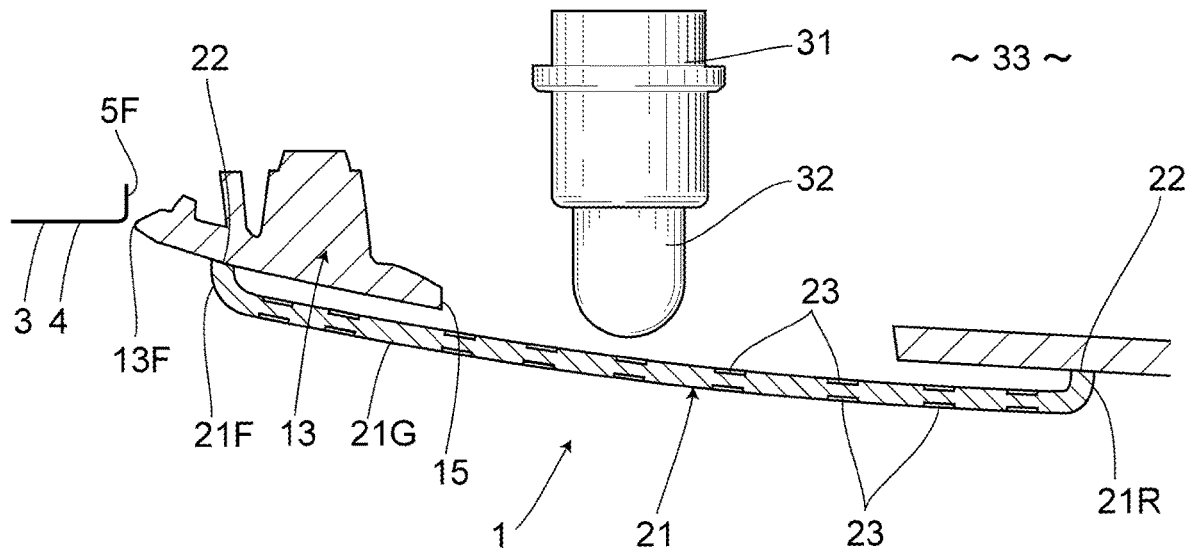
FIG. 8 is a plane section thereof.

Moreover, each of the edge portions 21F, 21R, 21U and 21S is bended toward the inner surface side of the lens 21. As shown in FIG. 8, the lens 21 is fixed to the fixation portion 13 with an inner end portion 22 of the front edge portion 21F and an inner end portion 22 of the rear edge portion 21R abutting against the outer surface of the fixation portion 13. The lens 21 employed is a colored lens that is colored in, for example, orange. In this case, the lens 21 may be a translucent body, and a lighting body 31 may be that emitting an orange- or umber-colored light.

Further, a central region of the lens 21 in the height direction is slanted in a manner such that a rear side of such region is positioned outward in the vehicle width direction as compared to a front side thereof, and such slanted portion is established by an outer surface 21G of the lens 21. In addition, the outer surface 21G of the lens 21 is formed into a curved surface where a central region thereof in the vertical direction is positioned outward in a vehicle left-right direction as compared to the upper and lower edge portions 21U and 21S.

The lighting body 31 as a direction indicator is housed in a space defined by the door outer surface 4 of the vehicle 2 and the outer surface 21G as the slanted portion of the lens 21. Here, the lighting body 31 serves as a light source. Further, as shown in FIG. 8, an opening section 15 corresponding to the inner surface of the lens 21 is provided on the fixation portion 13, and a light-emitting portion 32 of the lighting body 31 is arranged at such opening section 15 so that transmissive illumination is made possible from the inner surface side of the lens 21 as the lighting body 31 flashes. The lens 21 is larger than the opening section 15. However, the lens 21 may be substantially formed into a size as large as the opening section 15. Such lens 21 may then be provided on the opening section 15 in a fashion that the outer surface of this lens 21 and the fixation portion 13 will be made flush with each other. In such case, it is preferred that a part corresponding to the lighting body 31 partially bulge outward.

Further, as shown in FIG. 8, the lighting body 31 is received in a door inner space 33 established in between the lens 21 and an inner surface (not shown) of the door 3. The lens 21 bulges outward from the door outer surface 4 in the vehicle left-right direction. The front end side (vehicle outer side) of the light-emitting portion 32 of the lighting body 31 is positioned outward as compared to the location of the door outer surface 4, whereas the rest part of the lighting body 31 is housed in the door inner space 33. Further, the light-emitting portion 32 is positioned at a center side of the lens 21 in both the height direction and the front-rear direction.

Figure 5:
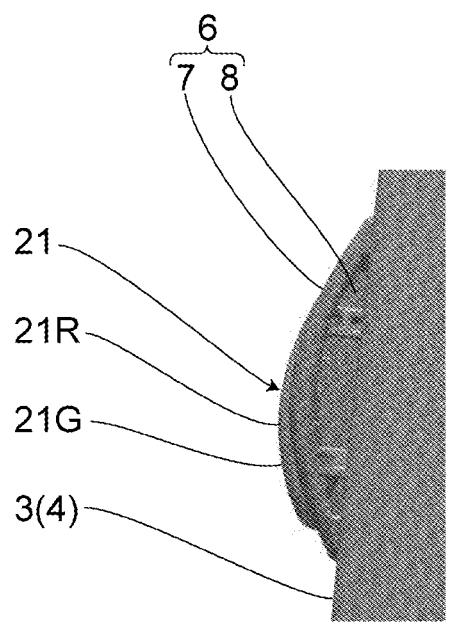
FIG. 5 is a rear view of the door handle of the first embodiment.
Figure 6:
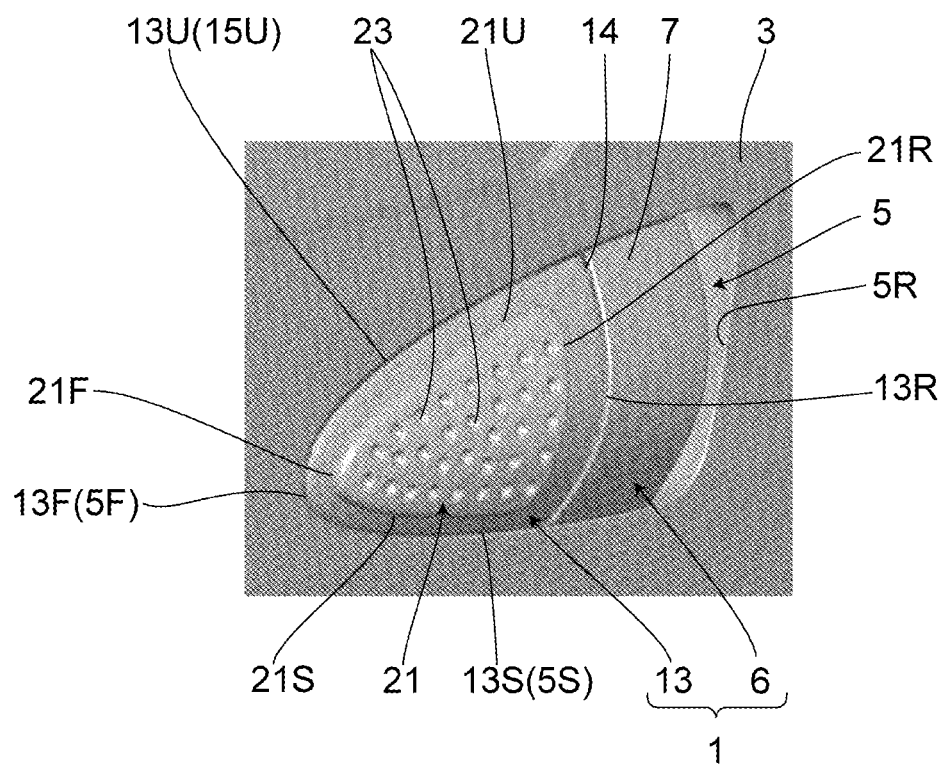
FIG. 6 is a perspective view thereof seen obliquely forward.

Further, as shown in FIG. 5 which is a rear view of the vehicle 2, a part of the lens 21 is visible from the outer surface of the operating portion main body 7 of the operating portion 6.

A plurality of concave portions 23 as light-diffusing portions are formed on both the inner and outer surfaces of the lens 21, and these multiple concave portions 23 compose concavities and convexities. Each of these concave portions 23 has a circular shape in a front view. The multiple concave portions 23 are aligned in both the vertical and front-rear directions in which those aligned in the vertical direction are substantially parallel to the rear edge portion 21R. Further, the concave portions 23 are formed at identical locations on both the inner and outer surfaces of the lens 21. However, the concave portions 23 may be only formed on one of the inner and outer surfaces of the lens 21. Also, if formed on both the inner and outer surfaces of the lens 21, the locations of the concave portions 23 may differ between the inner surface and the outer surface.

Next, the functions of the abovementioned structure are described. By activating the direction indicator, the lighting body 31 will flash such that the lights of the lighting body 31 will be diffused in a wide range through the multiple concave portions 23 provided on the lens 21, thus making it possible to secure a light distribution range 102 in the rear direction. Further, as shown in FIG. 5, since the lens 21 is partially visible from the outer surface of the operating portion main body 7 of the operating portion 6, the lens 21 can also be easily seen from the rear side.

Further, since the outer surface 21G of the lens 21 is slanted in the fashion that the rear side thereof is positioned outward in the vehicle width direction as compared to the front side thereof, the lens 21 can be seen from the front side of the vehicle 2, and the flashing can thus be seen easily as well.

In addition, since the door handle 1 is to be attached to the door 3 on which the concave portion 5 is provided, a degree of freedom for installation such as that for arranging the lighting body 31 will increase. That is, there does not exist a constraint that the lighting body 31 has to be assembled and fixed to the fixation portion 13 and its lens 21, and the door inner space 33 can thus be utilized. Thus, for example, the position of the lighting body 31 can be freely changed, and there may be freely arranged parts such as a light guiding body for guiding the lights of the lighting body 31 to the lens 21. Further, since the lighting body 31 is to be installed in the attachment area of the door handle 1, it is no longer required that an attachment hole(s) for the direction indicator be provided on a door panel and/or a fender.

In this way, in the present embodiment and in connection with the first aspect, provided is the door handle 1 to be attached to the door 3 of the vehicle 2. The door handle 1 includes the operating portion 6 that bulges from the door outer surface 4 of the vehicle 2, and allows the user to insert his or her hand thereinto; the fixation portion 13 that is aligned with the operating portion 6, and has the lens 21 as a translucent member; the outer surface 21G as the slanted portion that is provided on the lens 21, and has the vehicular rear side being positioned outward as compared to the vehicular front side thereof, such vehicular front side and vehicular rear side being referred to as a first side and a second side respectively; and the lighting body 31 as a direction indicator enabling transmissive illumination from the inner surface side of the lens 21. Therefore, the lens 21 can be easily seen not only from the side region, but also from the front side of the vehicle.

In this way, in the present embodiment and in connection with the second aspect, the fixation portion 13 is provided in the way such that it joins together the operating portion main body 7 as the bulging part of the operating portion 6 and the door outer surface 4 of the vehicle 2. The lighting body 31 is housed in the inner side of the fixation portion 13. For these reasons, the outer surface 21G as the slanted portion of the lens 21 can be easily seen from the front side.

In this way, in the present embodiment and in connection with the third aspect, the fixation portion 13 is positioned toward the front side of the vehicle as compared to the operating portion 6, and the vehicular rear side of the outer surface 21G is positioned outward as compared to the vehicular front side thereof. Thus, the lens 21 can be especially easily seen from the front side, and be housed in a compact manner.

In this way, in the present embodiment and in connection with the fourth aspect, concavities and convexities established by the multiple concave portions 23 are formed on at least one of the inner and outer surfaces of the lens 21 as a translucent member; in this embodiment, such concavities and convexities are formed on both the inner and outer surfaces of the lens 21. Therefore, lights can be diffused and thus be easily seen from various directions.

In this way, in the present embodiment and in connection with the seventh aspect, since the lighting body 31 is arranged in the door 3 of the vehicle 2, the degree of freedom for installation can be improved.

The effects of the present embodiment are as follows. Since the lens 21 is formed in the way such that the width thereof in the vertical direction is larger toward the rear side thereof from the front side thereof, a low level of air resistance will be exhibited as the vehicle advances, and a superior visibility from the front direction will be exhibited as well. Further, since the fixation portion 13 and the operating portion 6 as a whole are formed in a way such that a width thereof in the vertical direction is larger toward a rear side thereof from a front side thereof, the door handle 1 will be subjected to a low level of air resistance as the vehicle advances.

Moreover, since the multiple concave portions 23 are provided on the inner and outer surfaces of the lens 21, lights can be diffused at both the inner and outer surfaces, thus allowing lights to be distributed in a wide range. In addition, since the lens 21 is not provided on the opening section 15, but at a location outwardly apart from the opening section 15, the lens 21 can be seen easily. Also, the concave portion 5 is provided on the door outer surface 4, and the inner sides of the fixation portion 13 and the operating portion 6 are received in such concave portion 5, thereby resulting in a lower level of air resistance.

Second Embodiment

Figure 9:
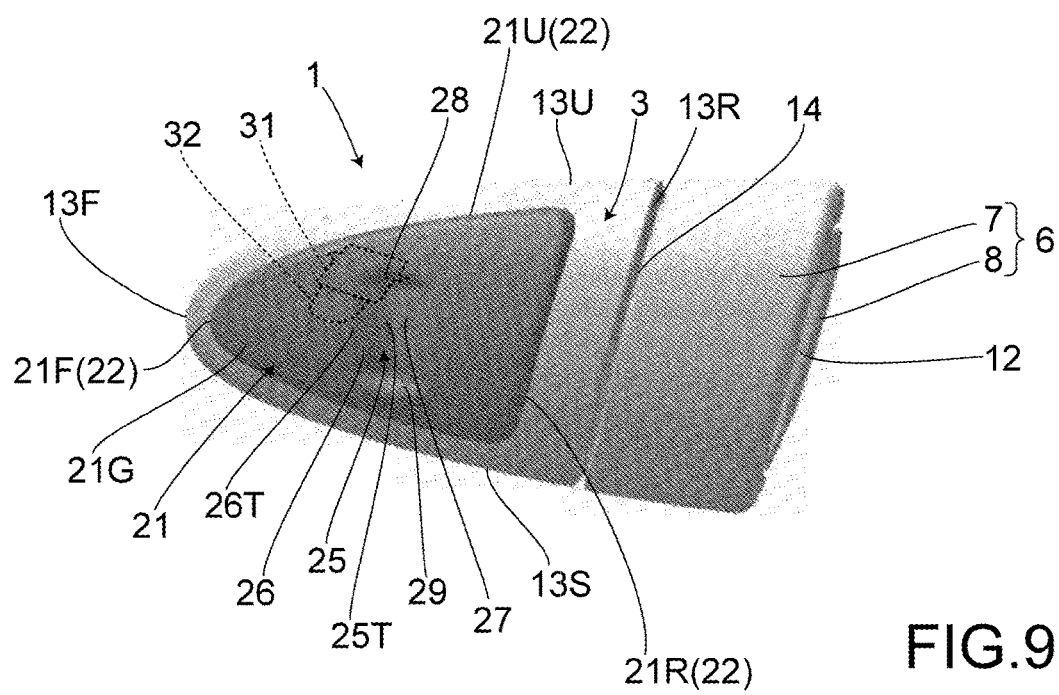
FIG. 9 is a perspective view showing a door handle of a second embodiment of the invention.
Figure 10:
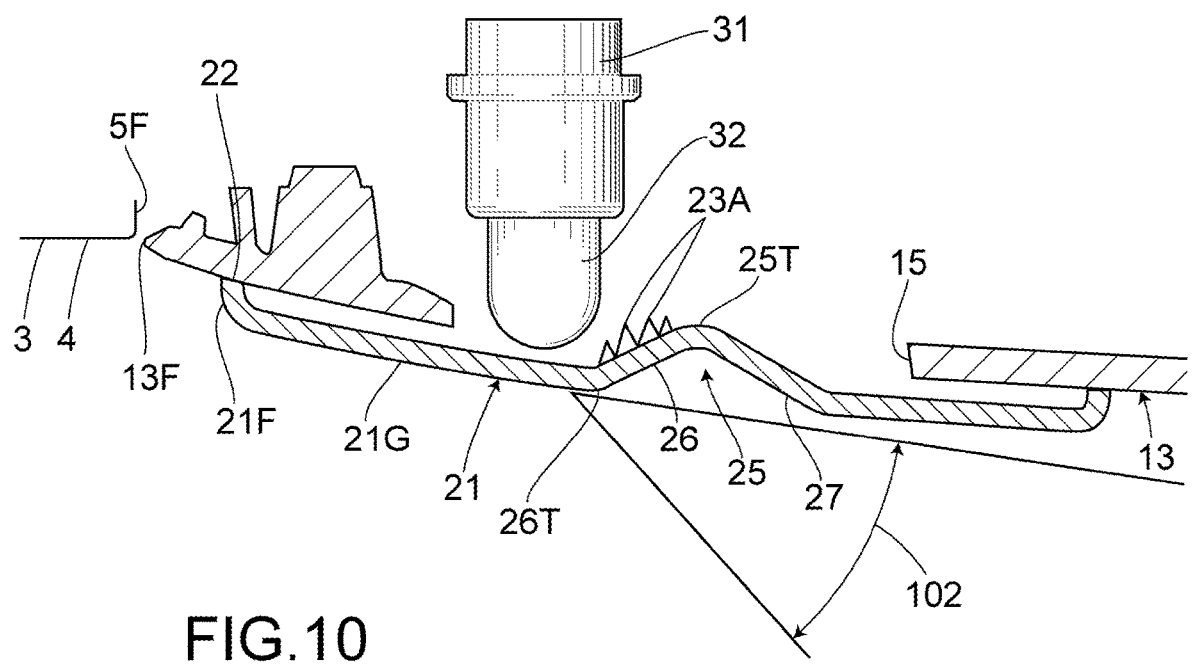
FIG. 10 is a plane section of the door handle of the second embodiment.
Figure 11:
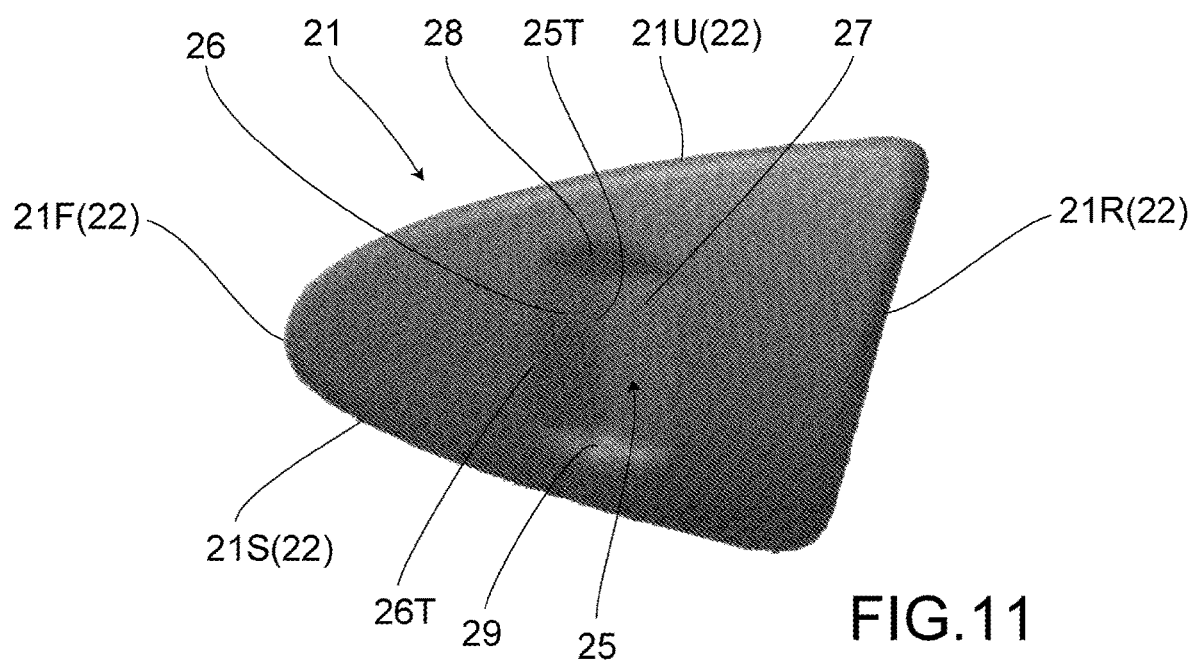
FIG. 11 is a perspective view of a lens of the door handle of the second embodiment.

FIG. 9 to FIG. 11 show a second embodiment of the present invention. Elements identical to those in the first embodiment are given identical symbols, and the detailed descriptions thereof are thus omitted. In this embodiment, the concave portions 23 are not formed on the lens 21, but a valley portion 25 dented toward the inner surface side is formed on the lens 21 instead.

The valley portion 25 is provided in a central region of the lens 21 in the front-rear direction, and is formed long in the vertical direction. A bottom portion 25T of the valley portion 25 is provided in the vertical direction (longitudinal direction), a front inclined surface 26 is formed in a manner such that it extends from the bottom portion 25T of the valley portion 25 toward the front side, and a rear inclined surface 27 is formed in a manner such that it extends from the bottom portion 25T toward the rear side.

Further, the front inclined surface 26 is inclined toward the inner side of the vehicle as well as the bottom portion 25T, and the rear inclined surface 27 is inclined toward the rear side and outer side of the vehicle from the bottom portion 25T. Furthermore, each of the inclined surfaces 26 and 27 is formed into the shape of a flat plate, and an included angle between the two inclined surfaces 26 and 27 is formed into an obtuse angle. Moreover, as shown in FIG. 10, convex portions 23A each having a substantially triangle cross-section is provided on the inner surface of the front inclined surface 26, and the multiple convex portions 23A compose concavities and convexities. Particularly, the convex portions 23A may be those having a protruding shape; or those formed into the shape of a protruding stripe that is long in the vertical direction. If formed into the shape of such protruding stripe, the shape of the triangle cross-section shall be continuous in the vertical direction.

Further, flat plate-shaped upper and lower surface portions 28 and 29 are respectively provided on the upper and lower regions of the valley portion 25. Specifically, the upper surface portion 28 extents outward from the bottom portion 25T, and is slanted upward toward the outside; the lower surface portion 29 also extends outward from the bottom portion 25T, but is slanted downward toward the outside. A gap between these upper and lower surface portions 28 and 29 is formed into a tapered shape widening toward the outside from the bottom portion 25T.

Further, the light-emitting portion 32 of the lighting body 31 is positioned beyond the bottom portion 25T toward the front side of the vehicle, and is located at a central area of the lens 21 in the vertical direction. Particularly, the light-emitting portion 32 is positioned on the inner surface side of a part of the lens 21 that is beyond the front inclined surface 26 in the front direction, and is located in the vicinity of a bended portion 26T between the front inclined surface 26 and the front side of the valley portion 25 of the lens 21. Due to such configuration, a greater amount of the lights from the light-emitting portion 32 can enter the inner surface of the front inclined surface 26 facing the rear side, as compared to the inner surface of the rear inclined surface 27. Therefore, the valley portion 25 provided on the lens 21 is capable of securing the light distribution range 102 in the rear direction of the vehicle.

In this way, the present embodiment provides functions and effects that are similar to those of the first embodiment.

Further, in the present embodiment and in connection with the fifth aspect, the valley portion 25 is formed on the lens 21 as a translucent member, and the bottom portion 25T of the valley portion 25 is located beyond the lighting body 31 in the rear direction of the vehicle, thereby allowing the lens 21 to be easily seen from the rear direction of the vehicle.

The effects of the present embodiment are as follows. That is, the bended portion 26T as a mountain-shaped portion is provided on the vehicular front side of the valley portion 25; the light-emitting portion 32 of the lighting body 31 is arranged on the vehicular front side of such bended portion 26T, and is preferably located in the vicinity of the bended portion 26T, thus making it possible to secure a light distribution range 102 in the rear direction.

Third Embodiment

Figure 12:
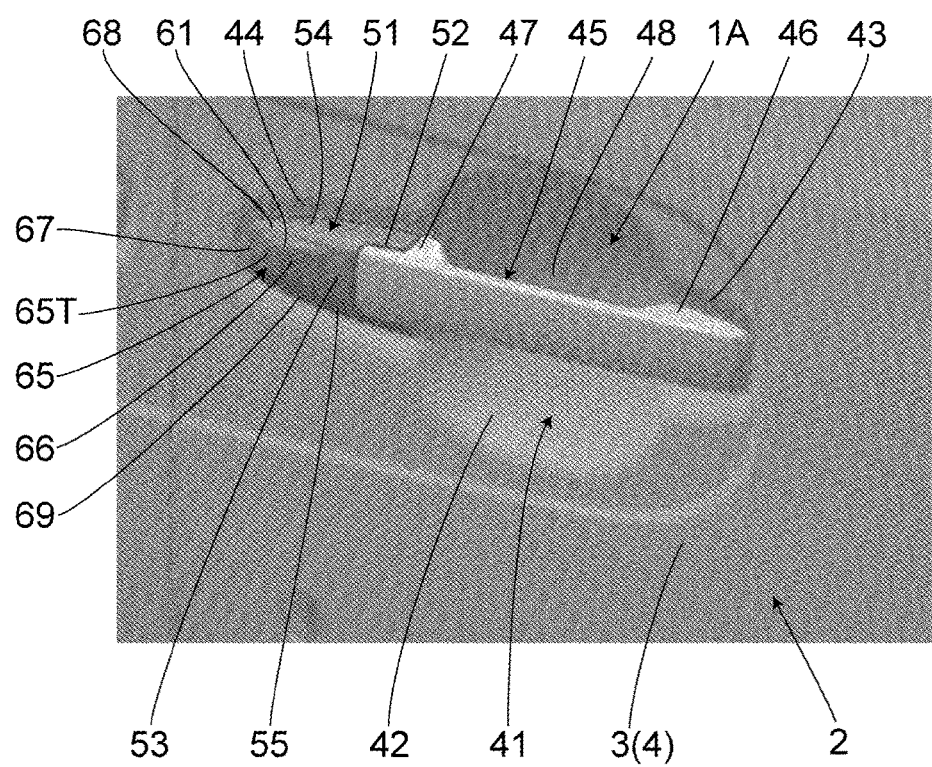
FIG. 12 is a perspective view of a door handle of a third embodiment of the invention.
Figure 13:
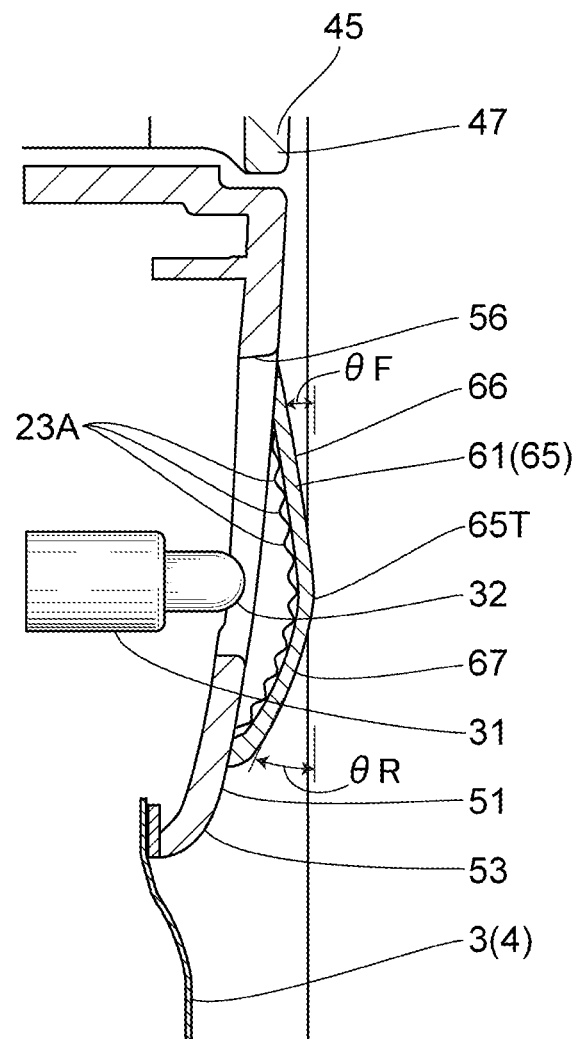
FIG. 13 is a plane section of the door handle of the third embodiment.
Figure 14:
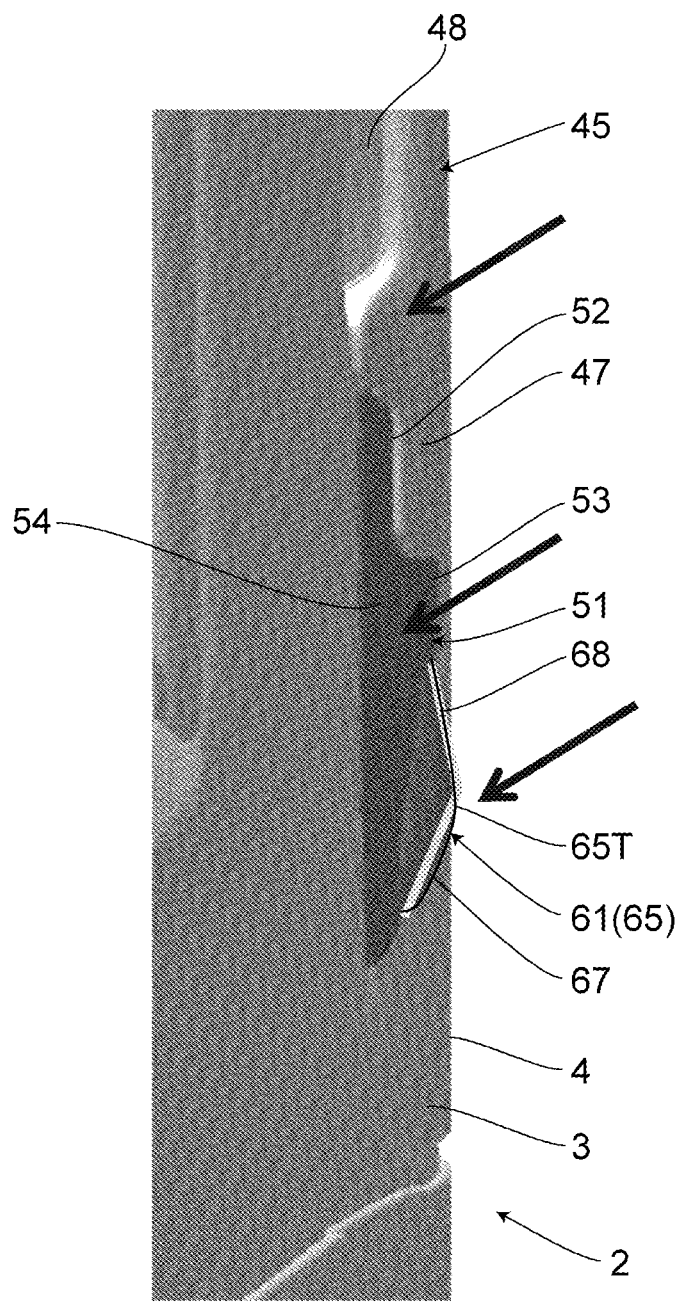
FIG. 14 is an explanatory plan view showing the door handle of the third embodiment.

FIGS. 12 to 14 show a third embodiment of the present invention. Elements identical to those in the first embodiment are given identical symbols, and the detailed descriptions thereof are thus omitted. This embodiment illustrates a variation of the door handle 1A where the fixation portion and the lens are both arranged on the rear side of the operating portion.

This embodiment illustrates a door handle 1A that is provided on the door 3 on the right side of the vehicle. The door outer surface 4 is formed with a concave portion 41 for the handle. The concave portion 41 includes a central concave portion 42, formed in a central region of the concave portion 41 with respect to the front-rear direction, as well as a front concave portion 43 and a rear concave portion 44 respectively provided in a continuous manner on the front and rear sides of the central concave portion 42. The front concave portion 43 and the rear concave portion 44 are formed vertically narrower than the central concave portion 42.

The operating portion 45 has a shape of a bar, and a front portion 46 of the operating portion 45 is arranged within the front concave portion, while a front side of the front portion 46 is rotatably connected to the door 3 via a pivot shaft (not shown).

The fixation portion 51 is mounted on the rear concave portion 44. On the front outer surface 53 of the fixation portion 51 is provided an engageable concave portion 52 to which a rear portion 47 of the operating portion 45 is engageably inserted. The engageable concave portion 52 is arranged on the front outer surface 53 of the fixation portion 51.

As shown in FIG. 12, as the engageable concave portion 52 is engaged with the rear portion 47, the outer surface of the operating portion 45 is continuous without a gap to the outer surface 53 of the fixation portion 51. The fixation portion 51 is provided in a way such that it joins together rear portion 47 of the operating portion 45 and the door outer surface 4 surrounding the rear concave portion 44. The operating portion 45 and fixation portion 51 bulge from the door outer surface 4.

Further, as the engageable concave portion 52 is engaged with the rear portion 47, a clearance 48 is provided between the operating portion 45 and the central concave portion 42 for allowing the user to insert his or her hand thereinto.

A link piece (not shown) is connected, at the door side, to the rear portion 47 of the operating portion 45, and this link piece is then connected to a door lock device (not shown) of the vehicle 2. Here, by putting a hand on the inner surface side of the operating portion main body 7 and then pulling the same toward the user, the operating portion 45 will pivot about the axis portion, thereby causing the link piece to be pulled outward, thus unlocking the door 3 locked by the door lock device.

The outer surface 53 of the fixation portion 51 extends from the rear side toward the front side of the vehicle with a slope inwardly inclined in the width direction of the vehicle. Between the door outer surface 4 and the upper-and-lower ends of the outer surface 53 are provided upper face portion 54 and lower face portion 55.

A lens 61 as a translucent member is provided on the outer surface 53 of the fixation portion 51. Underneath the lens 61, the outer surface 53 has an opening section 56. The lens 61 has a rectangular shape in a side view whose longitudinal sides are aligned with the longitudinal direction of the vehicle.

The lens 61 forms a mountain portion 65 that is outwardly projected. This mountain portion 56 is formed in a substantially entire longitudinal length of the lens 61. As shown in FIG. 13, a front inclined surface 66 is extended from the top portion 65T of the mountain portion 65 toward the front, and a rear inclined surface 67 is extended from the top portion 65T toward the back.

The top portion 65T is positioned more outward in the vehicle width direction than the outer surface of the operating portion 45. Further, when viewed from the rear side of the vehicle 2, a part of the rear inclined surface 67 protrudes more outward than the outer surface of the operating portion 45.

Further, the front slanting surface 66 is slanted toward the tope portion 65T in a way such that it is slanted toward the outer side of the vehicle where the front inclined surface 66 is provided as a slanted portion; and the rear slanting surface 67 is slanted from the top portion 65T in a way such that it is slanted rearward and toward the inner side of the vehicle where the rear inclined surface 67 is also provided as a slanted portion. Furthermore, each of the inclined surfaces 66 and 67 is formed into a shape of a flat plate, and the angle between the two inclined surfaces 66 and 67 is defined as an obtuse angle. Moreover, as shown in FIG. 13, multiple convex portions 23A are provided on the inner surfaces of the two inclined surfaces 66 and 67, and the multiple convex portions 23A compose concavities and convexities. The convex portions 23A of this example each has a cross-section of approximate isosceles triangle.

Further, flat plate-shaped upper and lower surface portions 68 and 69 are respectively provided on the upper and lower regions of the mountain portion 25. Specifically, the upper surface portion 68 extents outward from the outer surface 53, and is slanted downward toward the outside; the lower surface portion 69 also extends outward from the outer surface 53, but is slanted upward toward the outside. A distance between these upper and lower surface portions 68 and 69 is thus narrowed as a tapered region from the outer surface 53 toward the outside.

Here, the front inclined surface 66 is formed longer than the rear inclined surface 67. The angle $\theta_R$ of the rear inclined surface 67, with respect to the longitudinal direction of the vehicle 2, is set to be greater than the angle $\theta_F$ of the front inclined surface 66 with respect to the longitudinal direction of the vehicle 2 where both of the angles $\theta_R$ and $\theta_F$ are defined as angles to the reference line 101.

Moreover, the light-emitting portion 32 of the lighting body 31 centers on a position located toward the front side of the vehicle as compared to the top portion 65T, and is positioned in the central region of the lens 21 in the vertical direction. In this case, the light-emitting portion 32 is arranged within the region of the mountain portion 65, particularly in the vicinity of the top portion 65T. In this way, the lights from the light-emitting portion 32 can enter the two rear slanting surfaces 66 and 67 to ensure visibility from the front or rear of the vehicle.

In this way, in the present embodiment and in connection with the first aspect of the invention, provided is the door handle 1A to be attached to the door 3 of the vehicle 2. The door handle 1A includes the operating portion 45 that bulges from the door outer surface 4 of the vehicle 2, is provided at a distance from the door outer surface 4 of the vehicle 2, and a space defined therebetween allows the user to insert his or her hand thereinto; the fixation portion 51 that is aligned with the operating portion 45, and has the lens 61 as a translucent member; the front inclined surface 66 as the slanted portion that is provided on the lens 61, and has the vehicular rear side being positioned outward as compared to the vehicular front side thereof, such vehicular front side and vehicular rear side being referred to as a first side and a second side respectively; and the lighting body 31 as a direction indicator enabling transmissive illumination from the inner surface side of the lens 61. Therefore, the lens 61 can be easily seen from the front side of the vehicle, thus providing functions and effects that are similar to those of the abovementioned embodiments.

Further, in the present embodiment and in connection with the first aspect, provided are: the rear inclined surface 67 as the slanted portion that is provided on the lens 61, and has the vehicular front side being positioned outward as compared to the vehicular rear side thereof; and the lighting body 31 as a direction indicator enabling transmissive illumination from the inner surface side of the lens 61. Therefore, the lens 61 can be easily seen from the rear side of the vehicle, thus providing functions and effects that are similar to those of the abovementioned embodiments.

The effects of the present embodiment are as follows. The light-emitting portion 32 of the lighting body 31 is arranged in a position located anterior to the top portion 65T, and preferably located in the vicinity of the top portion 65T, so as to irradiate light to the region anterior to and in vicinity of the top portion 65T to thereby secure rearward light distribution range 102.

Further, the lens 61 includes the front inclined surface 66 and the rear inclined surface 67 for allowing the lens 61 to be easily seen from both of the rear and front directions of the of the vehicle.

Fourth Embodiment

Figure 15:
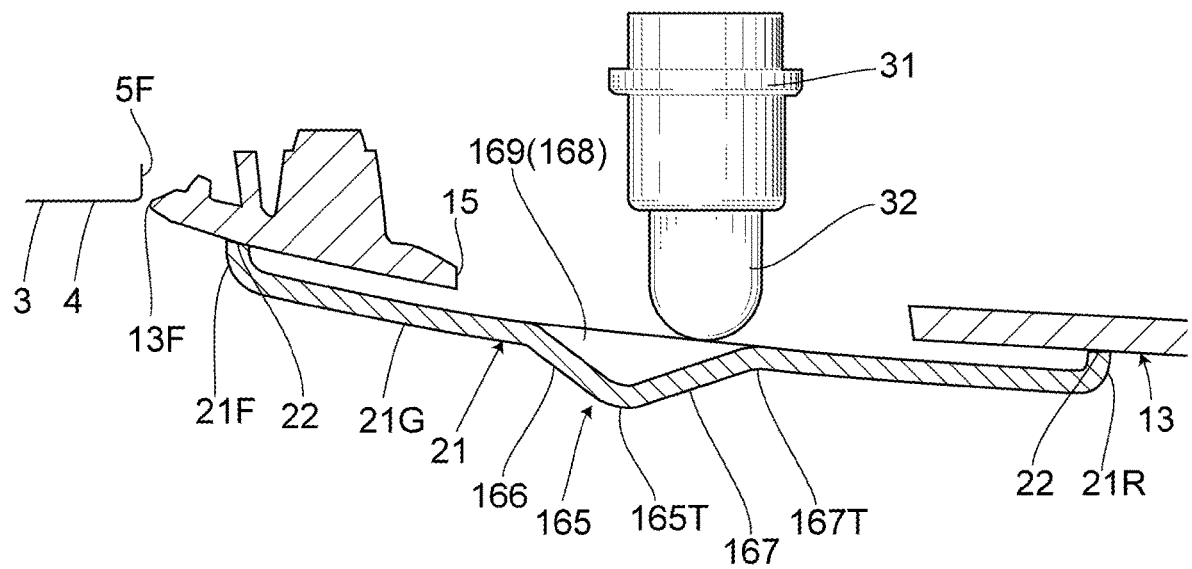
FIG. 15 is a section of a door handle of a fourth embodiment of the invention.
Figure 16:
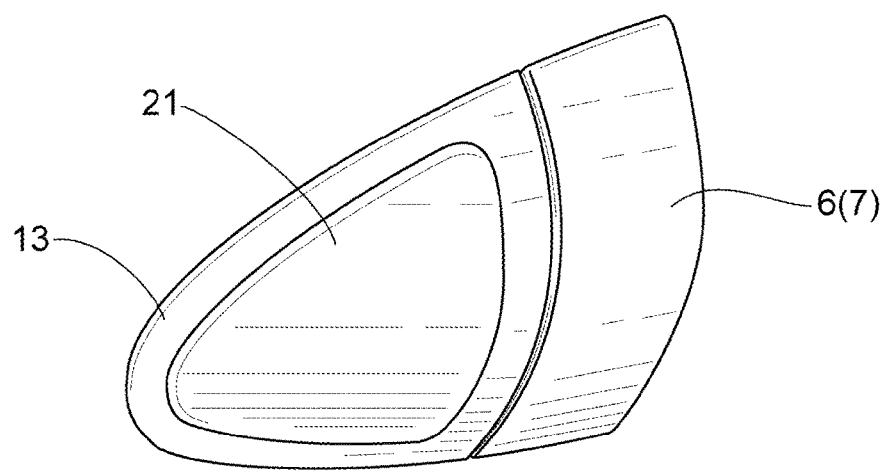
FIG. 16 is a perspective view of a door handle of a fifth embodiment of the invention.
Figure 17:
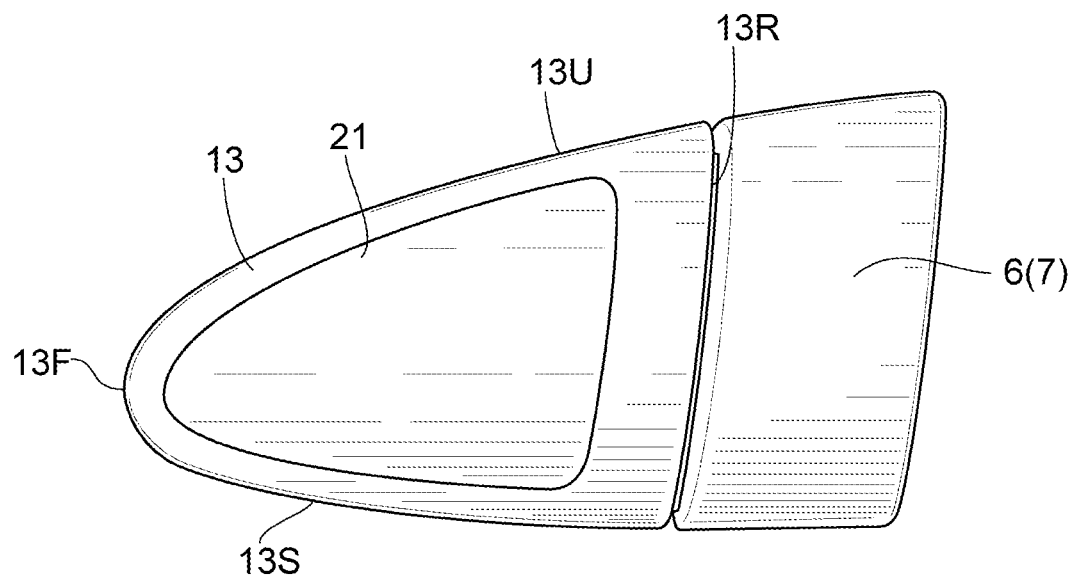
FIG. 17 is a front view of the door handle of the fifth embodiment.

FIG. 15 shows a fourth embodiment of the present invention. Elements identical to those in the above embodiments are given identical symbols, and the detailed descriptions thereof are thus omitted. In this embodiment, the valley portion 25 is not provided on the lens 21 of the second embodiment. Instead, a mountain portion 165 is formed thereon. Here, this mountain portion 165 corresponds to the mountain portion 165 described in the third embodiment, and the description thereof is made with "100" being added to the symbols of the similar members.

The mountain portion 165 protruding outward is formed on the lens 21; and is formed long in the vertical direction, in the central area of the lens 21 in the front-rear direction. As shown in FIG. 15, there are provided a front slanting surface 166 slanting forward from a top portion 165T of the mountain portion 165; and a rear slanting surface 167 slanting rearward from the top portion 165T.

Also, the top portion 165T is located outward in the vehicle width direction as compared to the operating portion 6. And, in the rear view of the vehicle 2, the rear slanting surface 167 is partially visible outward from the outer surface of the operating portion 6.

The front slanting surface 166 is slanted toward the tope portion 165T in a way such that it is slanted toward the outer side of the vehicle; and the rear slanting surface 167 is slanted from the top portion 165T in a way such that it is slanted rearward and toward the inner side of the vehicle.

Particularly, the front slanting surface 166 is proved on the lens 21, and serves as a slanted portion where the vehicular rear side thereof as one side is located on the outer side of the vehicle as compared to the vehicular front side thereof as the other side and one of the vehicular front and rear sides. Further, the rear slanting surface 167 is provided on the lens 21, and serves as a slanted portion where the vehicular front side thereof as one side is located on the outer side of the vehicle as compared to the vehicular rear side thereof as the other side and one of the vehicular front and rear sides. In addition, both the slanting surfaces 166 and 167 are formed into the shape of a flat panel, and an angle between the slanting surfaces 166 and 167 is an obtuse angle.

Further, an upper surface portion 168 is slanted in a way such that it becomes lower from the outer surface side of the fixation portion 13 toward the outside; and a lower surface portion 169 is slanted in a way such that it becomes higher from the outer surface side of the fixation portion 13 toward the outside. A distance between these upper and lower surface portions 168 and 169 is thus narrowed as a tapered region from the outer surface side of the fixation portion 13 toward the outside.

Moreover, the light-emitting portion 32 of the lighting body 31 is located toward the rear side of the vehicle as compared to the top portion 165T, and is positioned in the central region of the lens 21 in the vertical direction. The light-emitting portion 32 is located on the inner surface side of the rear slanting surface 167, and is positioned in the vicinity of a bended portion 167T provided between the rear slanting surface 167 and the rear side of the mountain portion 165 of the lens 21. In this way, the lights from the light-emitting portion 32 can enter the rear slanting surface 167 and enable transmissive illumination in the rear direction, thus achieving the aforementioned light distribution range.

In this way, the present embodiment provides functions and effects that are similar to those of the abovementioned embodiments.

Further, in the present embodiment and in connection with the sixth aspect, the mountain portion 165 is formed on the lens 21 as the translucent member, and the top portion 165T of the mountain portion 165 is located toward the front side of the vehicle in the front-rear direction as compared to the lighting body 31.

The effects of the present embodiment are as follows. That is, since there are provided the outer surface 21G and the front slanting surface 166, as the slanted portions on the front side, a superior visibility is achieved from the front side of the vehicle. Further, since there is provided the rear slanting surface 167 as the slanted portion on the rear side, a visibility can be ensured even from the rear side of the vehicle.

Fifth Embodiment

FIG. 16 to FIG. 23 show a fifth embodiment of the present invention. Elements identical to those in the above embodiments are given identical symbols, and the detailed descriptions thereof are thus omitted.

Figure 18:
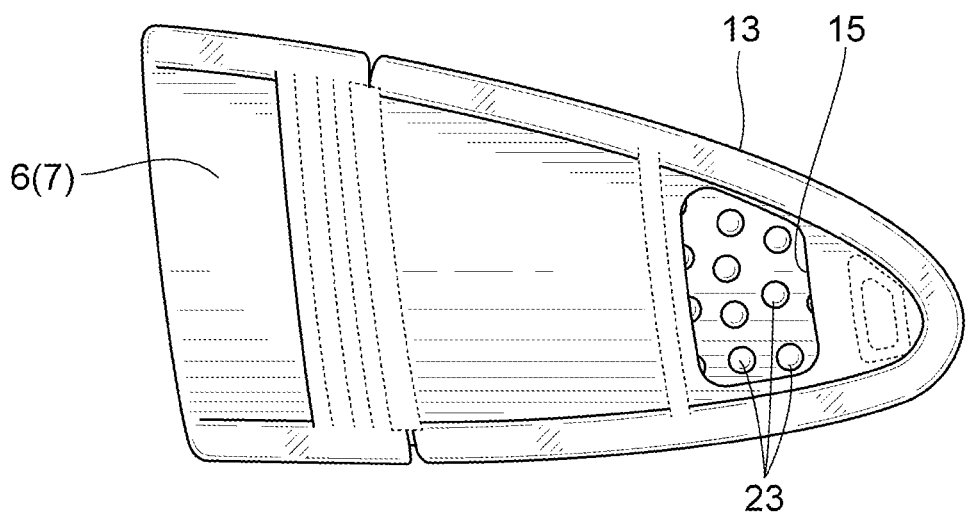
FIG. 18 is a rear view of the door handle of the fifth embodiment.
Figure 19:
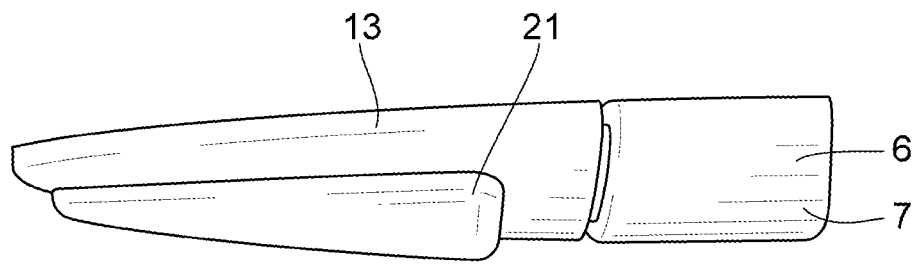
FIG. 19 is a plan view of the door handle of the fifth embodiment.
Figure 20:
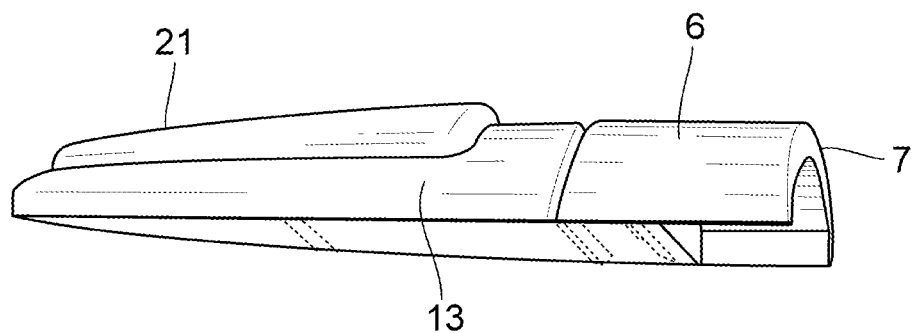
FIG. 20 is a bottom view of the door handle of the fifth embodiment.
Figure 21:
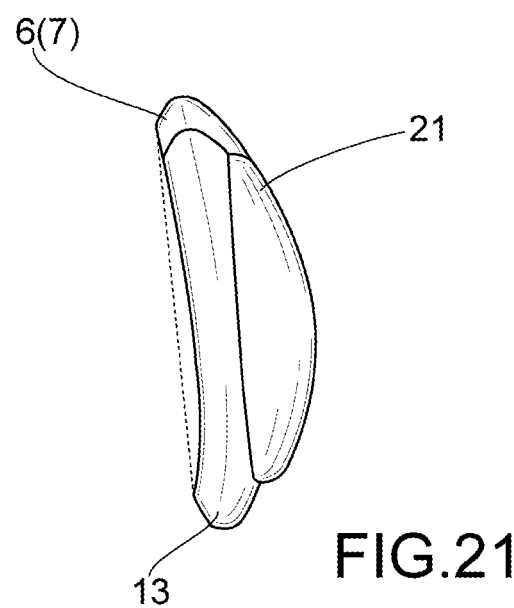
FIG. 21 is a right side view of the door handle of the fifth embodiment.
Figure 22:
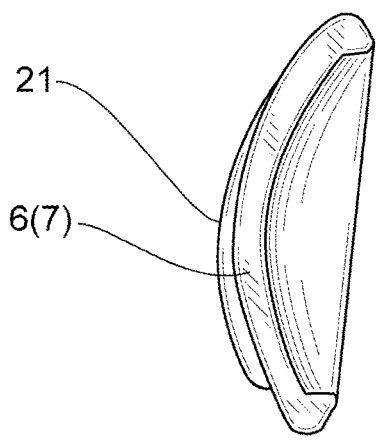
FIG. 22 is a left side view of the door handle of the fifth embodiment.
Figure 23:
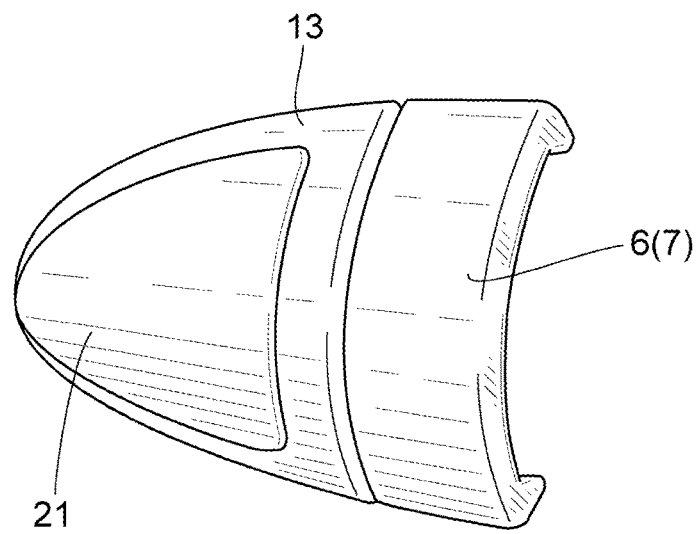
FIG. 23 is a perspective view of the door handle of the fifth embodiment, seen from the right side thereof.

As shown in FIG. 18, for example, the aforementioned opening section 15 is formed into a substantially trapezoidal shape. Further, in this embodiment, the concave portions 23 are not provided on the outer surface of the lens 21. Instead, as shown in FIG. 18, a plurality of the concave portions 23 are formed on the inner surface of the lens 21 so that concavities and convexities are now provided on the inner surface of the lens 21.

In this way, the present embodiment provides functions and effects that are similar to those of the abovementioned embodiments.

Sixth Embodiment

Figure 24:
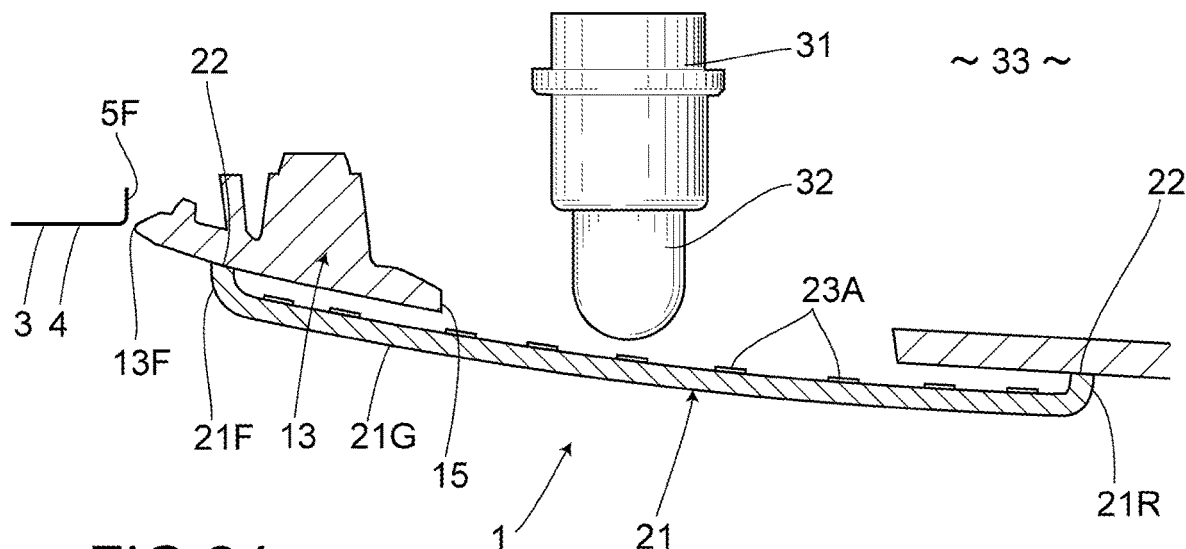
FIG. 24 is a plane section of a door handle of a sixth embodiment of the invention.

FIG. 24 shows a sixth embodiment of the present invention. Elements identical to those in the above embodiments are given identical symbols, and the detailed descriptions thereof are thus omitted.

In this embodiment, the concave portions 23 are not provided on the inner and outer surfaces of the lens 21. Instead, a plurality of the convex portions 23A are formed on the inner surface of the lens 21 so that concavities and convexities are now provided on the inner surface of the lens 21. Here, although the convex portions 23A are each substantially formed into the shape of a cylinder, they may selectively and appropriately have any kind of shape, provided that they are capable of diffusing lights.

In this way, the present embodiment provides functions and effects that are similar to those of the abovementioned embodiments. Further, in this embodiment, since there are no concavities and convexities formed on the outer surface of the lens 21, there does not exist a concern that trash may be collected in the concave portions or the like.

Seventh Embodiment

Figure 25:
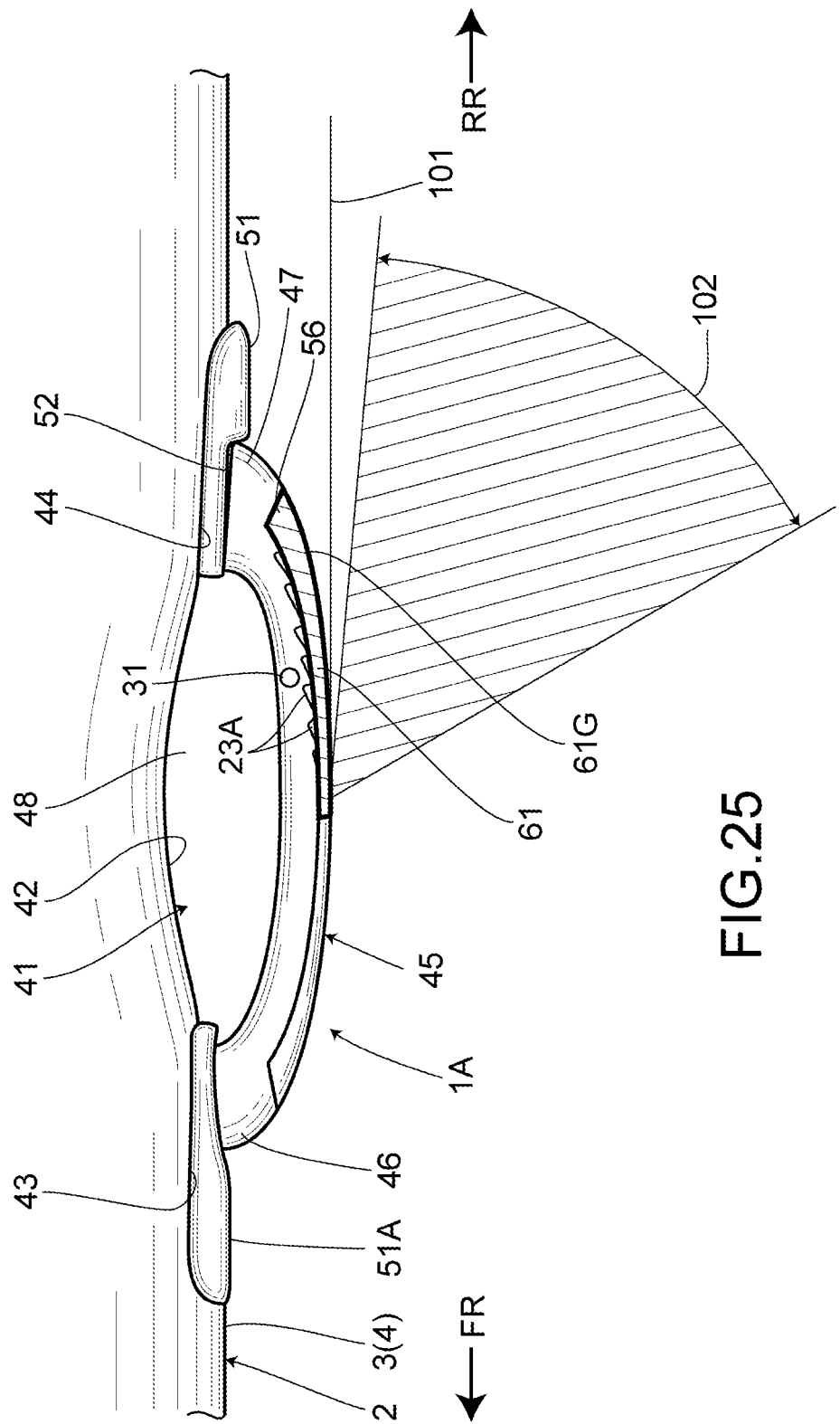
FIG. 25 is an explanatory plane section of a door handle of a seventh embodiment of the invention.
Figure 26:
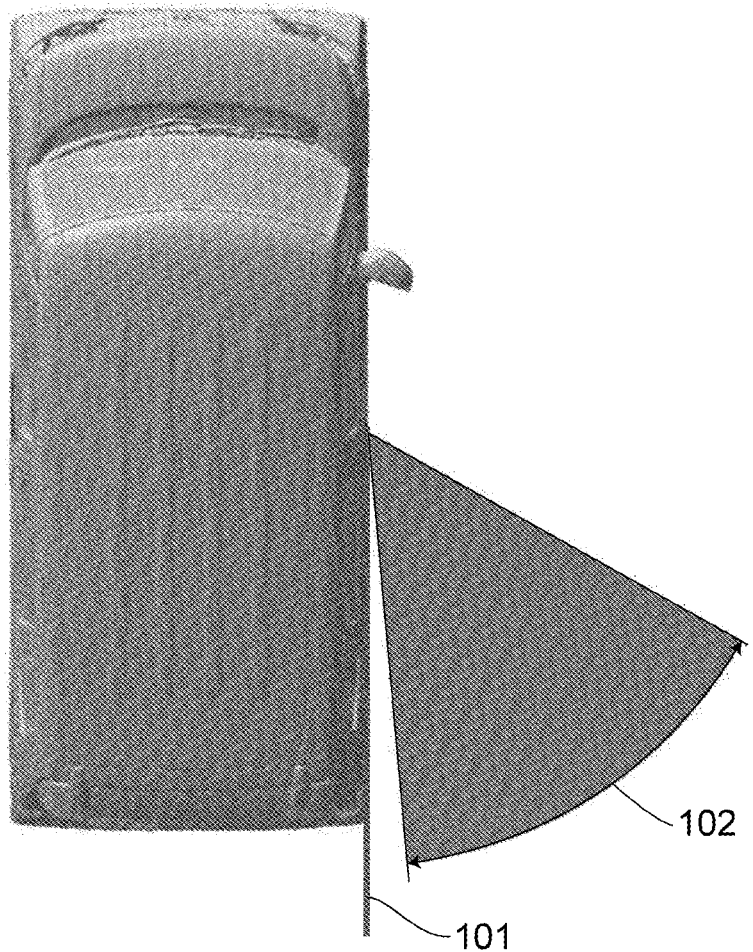
FIG. 26 is an explanatory plan view illustrating one example of a light distribution range of a side direction indicator.

FIG. 25 shows a seventh embodiment of the present invention. Elements identical to those in the above embodiments are given identical symbols, and the detailed descriptions thereof are thus omitted. In this embodiment, a lens 61 and the lighting body 31 are provided on an operating portion 45 of a door handle A1, and the lens 61 is located at the rear half side of the operating portion 45. Here, in FIG. 25, the left side is the front side of the vehicle 2, and the operating portion 45 is formed into a curved shape.

A front side fixation portion 51A is attached to a concave portion 43, and a front portion 46 of the operating portion 45 is rotatably connected to the fixation portion 51A or the door 3 on the fixation portion 51A side through a pivot shaft not shown. By pulling the rear side of the operating portion 45 toward the user, the operating portion 45 will rotate so as to allow the door 3 to be opened.

The operating portion 45 is formed in midair, an opening section 56 is provided on the outer surface of the operating portion 45, and the lens 61 is provided on such opening section 56. Further, a plurality of the convex portions 23A are provided on the inner surface of the lens 61, and these multiple convex portions 23A compose concavities and convexities. Also, the lighting body 31 is arranged inside the operating portion 45, and this lighting body 31 illuminates the lens 61 from the inner side of the operating portion 45 in the fashion of transmissive illumination.

In addition, an outer surface 61G of the lens 61 composes a slanted portion. Since the outer surface 61G is curved and slanted in a way such that the front side thereof is located outward in the vehicle width direction as compared to the rear side thereof, the lens 61 is visible from the rear side of the vehicle 2, and the flashing can be seen easily therefrom.

In this way, in the present embodiment, provided is the door handle 1A to be attached to the door 3 of the vehicle 2. The door handle 1A includes: the operating portion 45 that bulges from the door outer surface 4 of the vehicle 2, is provided to define a space between the door outer surface 4 of the vehicle 2 and the operating portion 45, and allows the user to insert his or her hand thereinto; the lens 61 provided on the operating portion 45; the outer surface 61G that is provided on the lens 61, and serves as a slanted portion whose vehicular front side as one side is located toward the outer side of the vehicle as compared to the vehicular rear side thereof as the other side and as one of the vehicular front and rear sides thereof; and a lighting body 31 of the direction indicator for illuminating the lens 61 from the inner surface side in the fashion of transmissive illumination. Therefore, not only from the lateral side, the lens 61 can also be easily seen from the rear side of the vehicle.

In this way, in the present embodiment, since concavities and convexities that are established by a plurality of the convex portions 23A are formed on at least one of the inner and outer surfaces of the lens 61 as the translucent member, and are particularly formed on the inner surface thereof in this embodiment, the lights can be diffused and then easily seen from various directions.

In this embodiment, the lighting body 31 is arranged inside the operating portion 45; and a harness (not shown) for supplying power to such lighting body 31 is passed through the front side of the inner region of the operating portion 45 as well as the front side fixation portion 51A, and then drawn and returned to the inner region of the door 3 so as to be connected to a vehicle-mounted power source (not shown).

However, the present invention is not limited to the aforementioned embodiments, but may be modified in various ways within the scope of the gist of the invention. For example, with regard to the door handle, it is sufficient that at least a part of the fixation portion bulges. Further, the entire outer surface of the fixation portion may be covered by a lens. The lighting body may be installed in the fixation portion and the lens. Although the concave portions 23 are provided on both surfaces of the lens in the embodiments, they may be provided only on one of the outer and inner surfaces of the lens; the shapes and sizes of the concave portions 23 may be appropriately selected so long as they are capable of diffusing lights. While the lights of the lighting body are to directly irradiate the inner surface of the lens in the embodiments, the lights of the lighting body may also enter the lens through a light guiding body. Although there are employed one mountain portion and one valley portion in the embodiments, there may be multiple mountain and valley portions; the mountain portion(s) may be combined with the concave portions 23, or the valley portion(s) may be combined with the concave portions 23 as well. The door handle of the present invention may also be provided on the rear seat door. The lens may also be that having smooth inner and outer surfaces without a valley, mountain or concave portion(s). The inner end portion 22 of the lens is also the inner surface side of the lens. The lighting body may employ various lighting bodies such as LEDs and bulbs. Concavities and convexities may be formed as a combination of concave and convex portions. The fixation portion and the lens may be those made of a synthetic resin.

What is claimed is:

1. A door handle to be attached to a door of a vehicle, comprising:

an operating portion that bulges outward from a door outer surface, defining a space between the door outer surface and the operating portion, allowing a user to insert his or her hand into the space;

a fixation portion that bulges outward from the door outer surface and is arranged adjacent to the operating portion, the fixation portion including a translucent member, the operating portion being movable outward relative to the fixation portion;

a slanted portion provided in the translucent member; and a lighting body serving as a direction indicator allowing a transmissive illumination to be made from the inner surface side of the translucent member, wherein a gap is provided between the fixation portion and the operating portion, the fixation portion is positioned anterior to the operating portion in the vehicle, the slanted portion has a vehicular rear side portion thereof positioned outward as compared to a vehicular front side portion thereof, and the translucent member is provided on an outer surface of the fixation portion.

2. The door handle according to claim 1, wherein the fixation portion is provided in a way such that it joins together a bulging part of the operating portion and the door outer surface of the vehicle, while the lighting body is housed inside the fixation portion.

3. The door handle according to claim 1, wherein concavities and convexities are formed on at least one of the inner and outer surfaces of the translucent member.

4. The door handle according to claim 2, wherein concavities and convexities are formed on at least one of the inner and outer surfaces of the translucent member.

5. The door handle according to claim 1, wherein a valley portion is formed on the translucent member, and the bottom portion of the valley portion is located beyond the lighting body in the rear direction of the vehicle.

6. The door handle according to claim 2, wherein a valley portion is formed on the translucent member, and the bottom portion of the valley portion is located beyond the lighting body in the rear direction of the vehicle.

7. The door handle according to claim 1, wherein the lighting body is housed in a door inner space.

8. The door handle according to claim 2, wherein the lighting body is housed in a door inner space.

9. The door handle according to claim 1, wherein the fixation portion is fixed to the door of the vehicle.

10. The door handle according to claim 1, wherein the translucent member bulges outward relative to the operating portion.

* * * * *